(12) United States Patent  (10) Patent No.: US 8,781,619 B2
Chan  (45) Date of Patent: Jul. 15, 2014

(54) AUTOMATIC CLOTHES RECEIVING AND RETRIEVING SYSTEM FOR LAUNDRY

(76) Inventor: Shih-Tsung Chan, Dayuan Township, Taoyuan County (TW)

( * ) Notice: Subject to any disclaimer, the term of this patent is extended or adjusted under 35 U.S.C. 154(b) by 37 days.

(21) Appl. No.: 13/585,175

(22) Filed: Aug. 14, 2012

(65) Prior Publication Data

US 2014/0052291 A1    Feb. 20, 2014

(51) Int. Cl.
 *G06F 7/00* (2006.01)
(52) U.S. Cl.
 USPC ........... 700/215; 700/213; 700/214; 700/216; 700/228; 700/230
(58) Field of Classification Search
 None
 See application file for complete search history.

(56) References Cited

U.S. PATENT DOCUMENTS

| 3,840,103 A | * | 10/1974 | Willis | 194/210 |
| 6,010,239 A | * | 1/2000 | Hardgrave et al. | 700/213 |
| 2003/0074105 A1 | * | 4/2003 | Capps et al. | 700/225 |

* cited by examiner

*Primary Examiner* — Yolanda Cumbess (57) ABSTRACT

An automatic clothes receiving and retrieving system for laundry, mainly includes a clothes receiving unit and a clothes retrieving unit. The clothes receiving unit is for inputting a verification information. The clothes are automatically received through a clothes receiving entrance and packed in clothes containers and identification tags are attached to the clothes containers. Each clothes container is arranged with a transfer device for moving the clothes container to a laundry factory and to send the clothes to the storage portion of the clothes retrieving unit after the clothes are cleaned. The clothes retrieving unit is for automatically transferring the cleaned clothes from the storage portion to the retrieving exits according to data of the consumer after the input of the verification information.

2 Claims, 8 Drawing Sheets

AUTOMATIC CLOTHES RECEIVING AND RETRIEVING SYSTEM FOR LAUNDRY

BACKGROUND OF THE INVENTION

1. Field of the Invention

The invention relates to an automatic clothes receiving and retrieving system for laundry and more particularly to an automatic clothes receiving and retrieving system for laundry which eliminates troubles in manually receiving or retrieving clothes and achieves the goal in reducing operation cost.

2. Brief Description of Related Art

According to operation of a conventional laundry, when a consumer sends clothes to the laundry, a receipt is made by the laundry and a paper with the same number as the receipt is attached to the clothes. When the consumer asks to retrieve the clothes, according to the receipt held by the consumer, the laundry seeks for the cleaned clothes with the same number and returns the clothes to the consumer. The operation mode of the conventional laundry not only requires manual process and has higher operation cost, but also is prone to lose clothes to be cleaned due to human error. It is necessary to overcome these drawbacks. With continuous researches and experiments based on years of experience in the laundry business, the applicant provides an automatic clothes receiving and retrieving system for laundry, more particularly, an automatic clothes receiving and retrieving system for laundry with automation in clothes receiving or retrieving and eliminates troubles in manual clothes receiving or retrieving.

SUMMARY OF THE INVENTION

The primary purpose of the invention is to provide an automatic clothes receiving and retrieving system for laundry. It eliminates troubles in manually receiving or retrieving clothes to reduce operation cost and prevent loss of clothes.

Said automatic clothes receiving and retrieving system for laundry includes a clothes receiving unit and a clothes retrieving unit. The clothes receiving unit is used for a consumer to input a verification information; thereafter clothes are automatically received through a clothes receiving entrance and packed in clothes containers and identification tags are attached to the clothes containers. Each clothes container is arranged with a transfer device for operator to move the clothes container to a laundry factory and to send the clothes to the storage portion of the clothes retrieving unit after the clothes are cleaned. The clothes retrieving unit is used to automatically transfer the cleaned clothes for the consumer from the storage portion to the retrieving exits according to data of the consumer after the consumer inputs a verification information for the consumer to retrieve the clothes from the retrieving exits. Thus, it eliminates troubles in manually clothes receiving or retrieving and achieves the goal in reducing operation cost.

Consumer verification for said automatic clothes receiving and retrieving system for laundry is card swiping or palm print identification etc.

The clothes retrieving unit of said automatic clothes receiving and retrieving system for laundry, wherein the clothes retrieving system includes hangers for hanging cleaned clothes or storage grids for storing cleaned and cleaned clothes, and conveyors for transferring hung and folded cleaned clothes.

DETAILED DESCRIPTION OF THE INVENTION

Please refer to FIGS. 1, 2, and 3, and FIGS. 4 and 5. They are respectively a three dimensional view of a whole embodiment, a three dimensional view of a clothes receiving unit, a structural view of a first storage area of a clothes retrieving unit, a structural view of a second storage area of a clothes retrieving unit, and a structural view of a third storage area of a clothes retrieving unit according to the invention. As shown in these figures, the invention includes a clothes receiving unit A and a clothes retrieving unit B which are juxtaposed or individually disposed. The clothes receiving unit A has a main controller 11 that is connected with a central monitoring and controlling system. The main controller 11 is connected with verification equipments such as a keyboard 12, a card reader 13 and a palm print identification device 14, and an identification tag printing and attaching device 15, and a monitor 16 for watching and observing. At a suitable position of the clothes receiving unit A is disposed a clothes receiving entrance 17. The clothes receiving entrance 17 has a gate 171 which is activated by the main controller 11.

Figure 1:
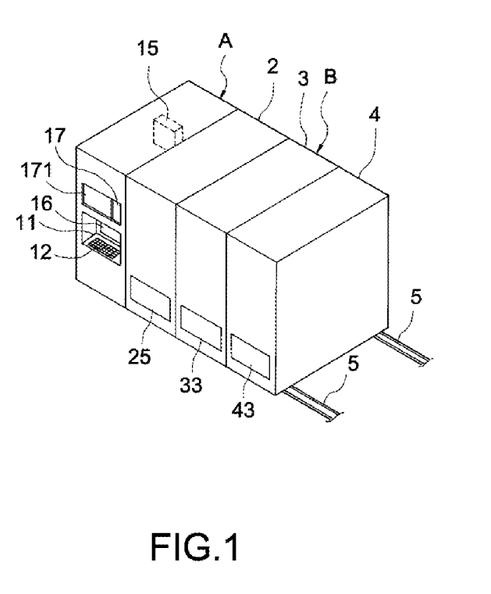
FIG. 1 is a three dimensional view of a whole embodiment of the invention.
Figure 2:
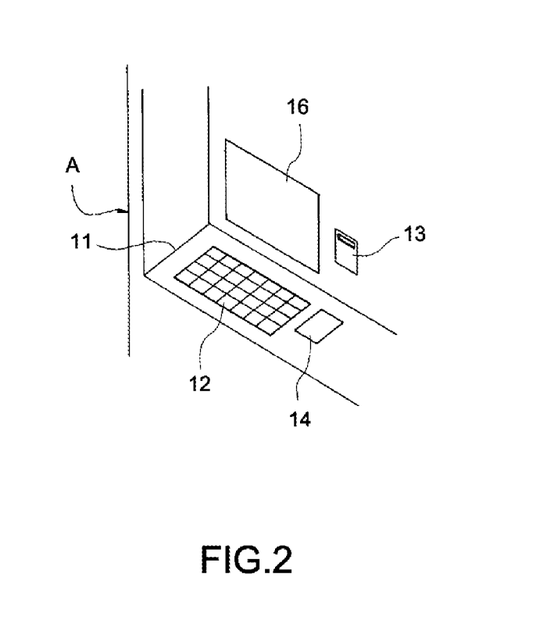
FIG. 2 is a three dimensional view of a clothes receiving unit of the invention.
Figure 3:
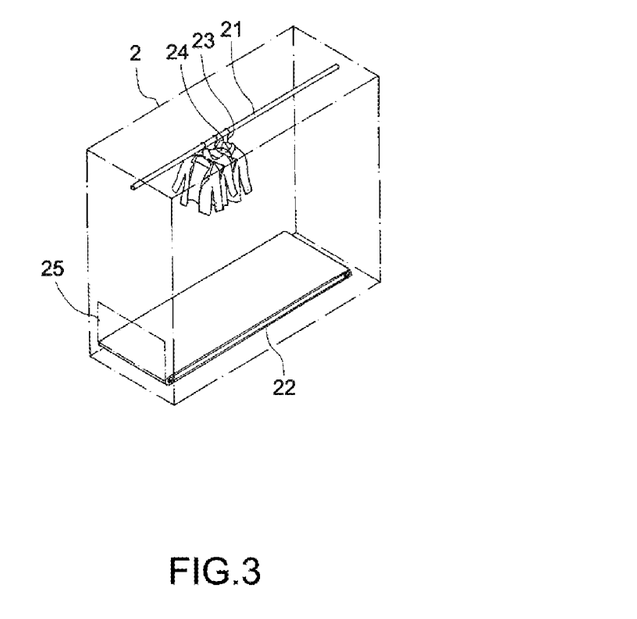
FIG. 3 is a structural view of a first storage area of a clothes retrieving unit of the invention.

The clothes retrieving unit B includes a first storage area 2, a second storage area 3, and a third storage area 4. The first storage area 2 has a rod 21 disposed at an upper section, and at a corresponding position at a lower section is disposed a conveyor 22. The rod 21 is for hanging a plurality of hangers 23, in between each of which is disposed a partition 24. At a front section of the rod 21 is disposed a clothes retrieving exit 25, where cleaned clothes are hung on the rod 21 by means of hangers 23.

Figure 4:
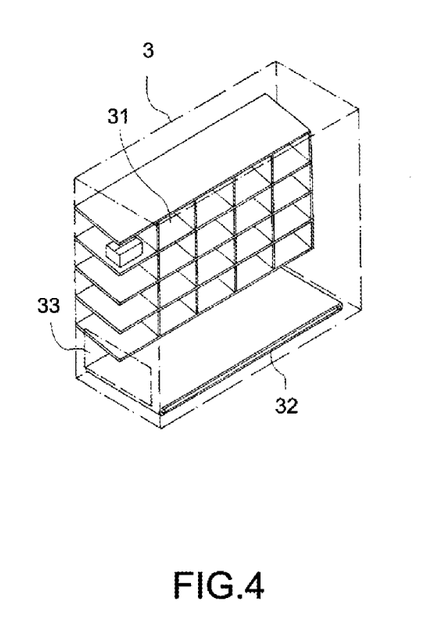
FIG. 4 is a three dimensional view of a second storage area of a clothes retrieving unit of the invention.

On one side of the second storage area 3 is disposed a plurality of intervally arranged storage grids 31. A conveyor 32 is disposed at a lower section and a clothes retrieving exit 33 is disposed at a front section. The storage grids are for storing clothes that have been cleaned, folded, and packed.

Figure 5:
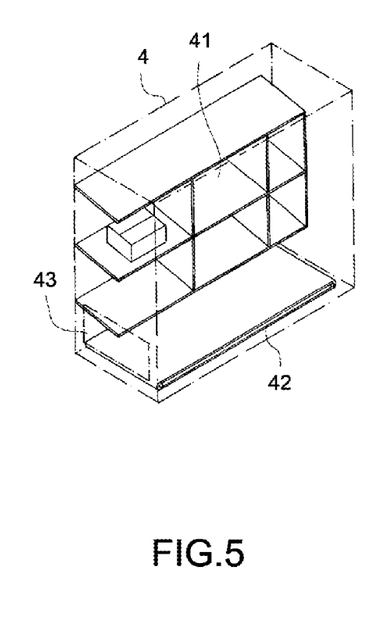
FIG. 5 is a structural view of a third storage area of a clothes retrieving unit of the invention.

On one side of the third storage area 4 is disposed a plurality of intervally arranged storage grids 41, which have a larger storage space. A conveyor 42 is disposed at a lower section and a clothes retrieving exit 43 is disposed at a front section. The storage grids are for storing larger-sized bedding articles such as bed sheets and bedspreads that have been cleaned, folded, and packed.

The foregoing first storage area 2, second storage area 3, and third storage area 4 of the clothes receiving unit A and clothes retrieving unit B can be disposed on tracks 5, so that the foregoing devices can move along the tracks. This arrangement can facilitate changes in the number of each device and its maintenance.

With said combination, the clothes receiving unit A and the clothes retrieving unit B can be juxtaposed or individually disposed to form an automatic clothes receiving and retrieving system for laundry. A consumer inputs verification information by card swiping, palm print identification, or password input, etc. After confirmation, the gate 171 is opened and clothes are received from the clothes receiving entrance 17 and packed in clothes containers. Identification tags are attached to clothes containers by an identification tag printing and attaching device 15 before operators move the clothes container to a laundry factory. After being cleaning, the clothes are hung on hangers or packed again in clothes containers. They are classified into hung, folded, and large-sized folded clothes and sent to the first storage area 2, second storage area 3, or third storage area 4 of the clothes retrieving unit B respectively. After the consumer inputs a verification information, according to the data of the consumer, cleaned clothes of the consumer are automatically transferred to the clothes retrieving exits 25, 33, and 43 via conveyors 22, 32, and 42 for the consumer to retrieve. This eliminates troubles in manual clothes receiving or retrieving and achieves the goal in reducing operation cost.

Figure 6:
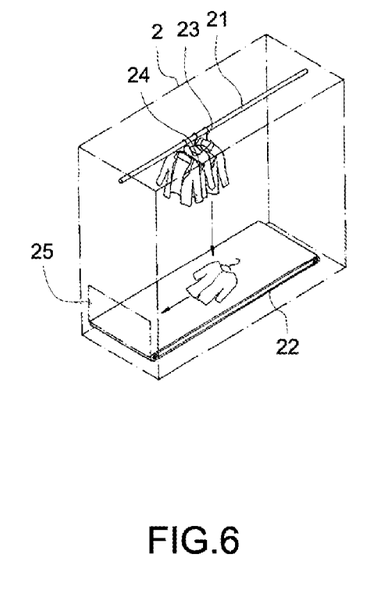
FIG. 6 is a schematic view of an embodiment of retrieving clothes according to the invention.

Please refer to FIG. 6, which shows a schematic view of an embodiment of retrieving clothes according to the invention. Please also refer to FIG. 2. As shown in these figures, according to the invention, during clothes retrieving, a consumer inputs verification information by swiping a card, palm print identification, or password input, etc. on a verification equipment such as a keyboard 12, a card reader 13, a palm print identification device 14, or an identification tag printing and attaching device 15, etc. that are connected to the main controller 11 of the clothes receiving unit A. After confirmation, the hangers 23 in the first storage area 2 are detached (electronically controlled) from the rod 21, and the cleaned clothes of the consumer are dropped unto the conveyor 22 to be automatically transferred to the clothes retrieving exit 25 for the consumer to retrieve.

Figure 7:
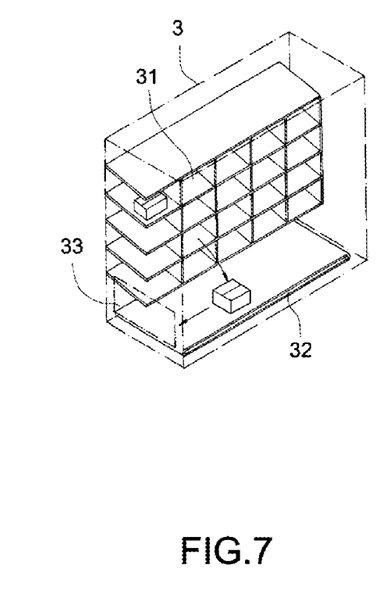
FIG. 7 is another schematic view of an embodiment of retrieving clothes according to the invention.
Figure 8:
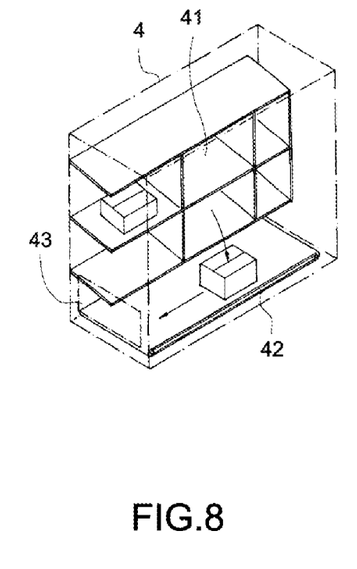
FIG. 8 is yet another schematic view of an embodiment of retrieving clothes according to the invention.

Please refer to FIG. 7, which shows another schematic view of an embodiment of retrieving clothes according to the invention. During (folded and packed) clothes retrieving, after confirmation of verification information, the clothes stored on the storage grids 31 in the second storage area 3 are dropped unto the conveyor 32 (Use stoppers when storing clothes and electronically open the stoppers when retrieving clothes.) to be automatically transferred to the clothes retrieving exit 43 for the consumer to retrieve.

The aforementioned embodiments are used for illustrate preferred embodiments of the invention but are not used to limit the scope of the invention. Those with slight variation and modification are not departing from the essence of the invention and are still within the spirit and the scope of the invention.

From the disclosure above, the invention forms an automatic clothes receiving and retrieving system for laundry with a clothes receiving unit and a clothes retrieving unit to eliminate troubles in manually receiving or retrieving clothes to achieve the goal of operation cost reduction and prevent loss of clothes. Since the invention is a practical design and an innovative creation, the applicant files the patent application of the invention in compliance with the United States patent law.

What is claimed is:

1. An automatic clothes receiving and retrieving system for laundry, comprising:
   a clothes receiving unit having a main controller connected with a central monitoring and controlling system, a palm print identification device and an identification tag printing and attaching device connected with the main controller, and a clothes receiving entrance is disposed thereof; wherein when a consumer verifies information on the main controller, clothes are automatically received from the clothes receiving entrance and packed in clothes containers after confirmation, and identification tags are attached to the clothes containers with the identification tag printing and attaching device;
   a clothes retrieving unit including at least a first storage area for hanging clothes, and a second storage area for storing cleaned, folded and packed clothes, and a third storage area for storing cleaned, folded and packed larger-sized bedding articles such as bed sheets and bedspreads; wherein after the consumer inputs a verification information by using palm print identification device, according to data of the consumer cleaned clothes for the consumer are automatically transferred from the storage area via a conveyor to the clothes retrieving exit for the consumer to retrieve.

2. The automatic clothes receiving and retrieving system for laundry of claim 1, wherein the clothes receiving entrance of the clothes receiving unit has a gate activated by the main controller and the gate is opened for receiving clothes only after confirmation of the verification information of the consumer.

\* \* \* \* \*